United States Patent
Sarca

(10) Patent No.: US 9,876,528 B2
(45) Date of Patent: Jan. 23, 2018

(54) SINGLE CHANNEL FULL DUPLEX WIRELESS COMMUNICATION

(71) Applicant: Redline Communications, Inc., Markham (CA)

(72) Inventor: Octavian Sarca, Aurora (CA)

(73) Assignee: Redline Communications, Inc., Markham (CA)

( * ) Notice: Subject to any disclaimer, the term of this patent is extended or adjusted under 35 U.S.C. 154(b) by 0 days.

(21) Appl. No.: 15/218,940

(22) Filed: Jul. 25, 2016

(65) Prior Publication Data

US 2016/0336994 A1 Nov. 17, 2016

Related U.S. Application Data

(63) Continuation of application No. 15/014,782, filed on Feb. 3, 2016, now Pat. No. 9,432,174, which is a
(Continued)

(51) Int. Cl.
*H04L 12/28* (2006.01)
*H04B 1/38* (2015.01)
(Continued)

(52) U.S. Cl.
CPC ............... *H04B 1/525* (2013.01); *H04B 1/40* (2013.01); *H04L 5/14* (2013.01); *H04L 5/1461* (2013.01); *H04W 24/02* (2013.01); *H04W 84/042* (2013.01)

(58) Field of Classification Search
CPC .............. H04B 1/44; H04B 1/525; H04L 5/14
(Continued)

(56) References Cited

U.S. PATENT DOCUMENTS 5,001,703 A * 3/1991 Johnson ................ H04L 5/1484
370/280
6,292,559 B1 * 9/2001 Gaikwad ................... H04L 5/14
370/201
(Continued)

OTHER PUBLICATIONS

Choi, J. et al. "Achieving Single Channel, Full Duplex Wireless Communication." *MobiCom '10*, Chicago, Illinois, Proceedings of the Sixteenth Annual International Conference on Mobile Computing and Networking. Sep. 20-24, 2010 (12 pages).
(Continued)

*Primary Examiner* — Parth Patel
*Assistant Examiner* — Jason Harley
(74) *Attorney, Agent, or Firm* — Rosenberg, Klein & Lee

(57) ABSTRACT

A single channel full duplex wireless communication system includes a processor, a transmitter, a receiver, a secondary transmission path, a combining element, a primary transmission feedback path and a secondary transmission feedback path. The transmitter transmits a transmission signal via a transmission path. The receiver receives a received signal via a reception path. The transmitter and the receiver utilize one channel to transmit and receive signals. The transmission signal causes self-interference. The processor estimates a first transfer function and feeds the secondary transmission path with the transmission signal adjusted by the first transfer function to reduce the transmission signal leaked to the reception path. The combining element combines the transmission signal with the adjusted secondary transmission path signal to remove the self-interference. The primary transmission feedback path output is modified by a second transfer function. The secondary transmission feedback path output is modified by a third transfer function.

1 Claim, 6 Drawing Sheets

Related U.S. Application Data continuation of application No. 14/024,246, filed on Sep. 11, 2013, now Pat. No. 9,288,033, which is a continuation of application No. 13/713,443, filed on Dec. 13, 2012, now Pat. No. 8,576,752.

(60) Provisional application No. 61/570,357, filed on Dec. 14, 2011.

(51) Int. Cl.

| | | |
|---|---|---|
| *H04B 1/10* | (2006.01) | |
| *H04B 1/525* | (2015.01) | |
| *H04B 1/40* | (2015.01) | |
| *H04L 5/14* | (2006.01) | |
| *H04W 24/02* | (2009.01) | |
| *H04W 84/04* | (2009.01) | |

(58) Field of Classification Search
USPC .......................................................... 370/277
See application file for complete search history.

(56) References Cited

U.S. PATENT DOCUMENTS

| | | | |
|---|---|---|---|
| 7,733,813 B2 | 6/2010 | Shin | |
| 8,031,744 B2 | 10/2011 | Radunovic | |
| 8,306,480 B2 | 11/2012 | Muhammad | |
| 8,576,752 B2 | 11/2013 | Sarca | |
| 2005/0052988 A1 | 3/2005 | Tsatsanis | |
| 2005/0141657 A1* | 6/2005 | Maltsev | H04L 25/03159 375/346 |
| 2007/0105509 A1 | 5/2007 | Muhammad | |
| 2008/0233894 A1 | 9/2008 | Aparin | |
| 2008/0242245 A1 | 10/2008 | Aparin | |
| 2009/0034437 A1 | 2/2009 | Shin | |
| 2009/0075612 A1* | 3/2009 | Keehr | H03D 7/14 455/226.1 |
| 2009/0180404 A1 | 7/2009 | Jung | |
| 2009/0186582 A1* | 7/2009 | Muhammad | H04B 1/525 455/63.1 |
| 2009/0268642 A1* | 10/2009 | Knox | H04L 12/66 370/277 |
| 2010/0029350 A1 | 2/2010 | Zhang | |
| 2010/0095180 A1* | 4/2010 | Sawai | H04L 1/0048 714/746 |
| 2010/0150032 A1 | 6/2010 | Zinser | |
| 2010/0150033 A1 | 6/2010 | Zinser | |
| 2010/0232324 A1* | 9/2010 | Radunovic | H04L 12/413 370/277 |
| 2011/0158346 A1 | 6/2011 | Ballantyne | |
| 2012/0147790 A1* | 6/2012 | Khojastepour | H01Q 3/2605 370/277 |
| 2012/0201153 A1 | 8/2012 | Bharadia | |
| 2012/0201173 A1 | 8/2012 | Jain | |
| 2013/0088393 A1 | 4/2013 | Lee | |
| 2013/0155913 A1 | 6/2013 | Sarca | |
| 2014/0010123 A1 | 1/2014 | Sarca | |
| 2014/0022965 A1 | 1/2014 | Sarca | |

OTHER PUBLICATIONS

Duarte, M. "Experiment-Driven Characterization of Full-Duplex Wireless Systems." Department of Electrical and Computer Engineering, Rice University. Aug. 4, 2011 (68 pages).

Duarte, M. et al. "Experiment-Driven Characterization of Full-Duplex Wireless Systems." arXiv: Computer Science: Information Theory; arXiv:1107.1276. Jul. 7, 2011 (32 pages).

Radunovic et al. "Rethinking Indoor Wireless: Low Power, Low Frequency, Full-Duplex." Microsoft Research, Microsoft Corporation: Technical Report MSR-TR-2009-148. 2009 (7 pages).

International Search Report dated Apr. 23, 2013 which issued in corresponding International Patent Application No. PCT/IB2012/057298 (3 pages).

Written Opinion dated Apr. 23, 2013 which issued in corresponding International Patent Application No. PCT/IB2012/057298 (4 pages).

International Search Report corresponding to co-pending International Patent Application Serial No. PCT/ Canadian Patent Office, dated Apr. 23, 2014; (4 pages).

International Written Opinion corresponding to co-pending International Patent Application Serial No. PCT/IB2013/061232, Canadian Patent Office, dated Apr. 23, 2014; (5 pages).

Li, Na; Zhu, Weihong; Han, Haihua, "Digital Interference Cancellation in Single Channel, Full Duplex Wireless Communication," Wireless Communications, Networking and Mobile Computing (WiCOM), 2012 8th International Conference on, vol., No., pp. 1,4, Sep. 21-23, 2012.

\* cited by examiner

SINGLE CHANNEL FULL DUPLEX WIRELESS COMMUNICATION

CROSS REFERENCE TO RELATED APPLICATIONS

This application is a continuation of pending U.S. application Ser. No. 15/014,782, filed Feb. 3, 2016, now allowed, which is a continuation of U.S. application Ser. No. 14/024,246, filed Sep. 11, 2013, now U.S. Pat. No. 9,288,033, which is a continuation of U.S. application Ser. No. 13/713,443, filed Dec. 13, 2012, now U.S. Pat. No. 8,576,752, which claims the benefit of U.S. Provisional Patent Application No. 61/570,357, filed Dec. 14, 2011, all of which are incorporated herein by reference in their entireties.

FIELD OF THE INVENTION

The present invention relates to duplex wireless communication, and more particularly, to systems and methods providing single channel full duplex wireless communication.

BACKGROUND OF THE INVENTION

Duplex communication systems are methods of transmitting signals that allow two people or two parts to communicate with one another in opposite directions. Duplex communication systems are widely used in the area of telecommunications and especially in telephony and computer networking. Existing duplex wireless communication systems include half-duplex and full duplex types.

Existing half-duplex wireless communication systems provide for communication in two directions, but only in one direction at a time. Thus, while the transmitter is transmitting, the receiver must wait until the transmitter stops before transmitting. Such systems require significant latency periods.

Full-duplex (also known as double-duplex) systems are capable of transmitting and receiving data-carrying signals simultaneously. Such systems still require that the transmissions be separated in some way to enable the receivers to receive signals at the same time as transmissions are being made. Such separation may be achieved by two well-known methods: frequency separation using frequency division duplex (FDD) and time separation using time division duplex (TDD).

FDD systems include a transmission antenna and a reception antenna and operate using two independent, non-overlapping channels, one for transmitting and one for receiving. This method requires implementation of complex filters to separate the very weak received signal from the very strong transmission signal and to enable the receiver not to be unduly affected by the transmitter signal.

TDD systems are capable of transmitting in two directions, but use a single channel that alternates between transmitting and receiving. Thus the transmitter and receiver operate on the same frequency, but only in one direction at a time. TDD systems do not require two channels and frequency selective filters to separate the received signal from the transmission system. However, TDD systems require a guard interval that includes (1) the time required for the transmission to travel from the transmitter to the receiver and (2) the time required for the receiver to change from receive to transmit mode. Thus, TDD systems tend to introduce more overhead and more latency than protocols used with full-duplex operations and are not generally suitable for use over long distances.

Frequency spectrum is becoming an increasingly scarce resource, while technological progress, particularly in the area of 3G and 4G telecommunication systems and wireless internet services, has greatly increased the demand for wireless broadband. Both full-duplex and half-duplex wireless communication systems utilize the wireless channel(s) in only one direction at any given moment of time, therefore wasting spectrum. There is a growing need to optimize the use of available spectrum and to provide a method and apparatus that can achieve satisfactory performance for short, medium, and long distance communications and allows a full-duplex wireless system to operate on a single channel, i.e., to utilize the wireless channel in both directions at the same time, therefore doubling the spectral efficiency.

Different solutions have been proposed to solve this problem. However, these solutions either involve the use of extra components such as antennas or other processing components, which means added complexity and cost.

SUMMARY OF THE INVENTION

According to one aspect of the present invention, a system for improving signal-to-interference ratio in a single channel full duplex wireless communication apparatus by significantly reducing self-interference is presented.

One embodiment of the present invention provides a method for improving signal-to-interference ratio in a single channel full duplex wireless communication apparatus by significantly reducing self-interference.

One embodiment of the present invention relates to a system that includes a processor, a transmitter coupled to the processor, a receiver coupled to the processor, a secondary transmission path coupled to the transmitter, a combining element coupled to the receiver, a primary transmission feedback path and a secondary transmission feedback path. The transmitter transmits a transmission signal via a transmission path. The receiver processes a received signal via a reception path. The transmitter and the receiver utilize one channel, at the same time, to transmit and receive the transmission and received signals. The transmission signal causes self-interference. The processor estimates a first transfer function and feeds the secondary transmission path with the transmission signal adjusted by the first transfer function in such a way that the secondary transmission path signal reduces the transmission signal leaked to the reception path. The combining element is configured to combine the transmission signal with the adjusted secondary transmission path signal, thereby removing at least a fraction of the self-interference.

According to a further aspect of the present invention, the primary transmission feedback path output is modified by a second transfer function. The secondary transmission feedback path output is modified by a third transfer function, such that combining of the modified primary transmission feedback path output and the modified secondary transmission feedback path output to the reception path output reduces the remaining fraction of the self-interference.

Another aspect of the present invention relates to a method of improving signal-to-interference ratio in a single channel full duplex wireless communication system. The method includes transmitting a transmission signal via a transmission path. The method also includes receiving a received signal via a reception path. The transmission path and the reception path utilize one channel, at the same time, to transmit and receive transmission and received signals. The transmission signal causes self-interference. The processor estimates a first transfer function. The processor feeds a secondary transmission path with the transmission signal adjusted by the first transfer function in such a way that the secondary transmission path signal reduces the transmission signal leaked to the reception path, thereby removing at least a fraction of the self-interference. The secondary transmission path is coupled to the transmitter. A combining element coupled to the receiver combines the transmission signal with the adjusted secondary transmission path signal.

According to a further aspect of the present invention, the processor also estimates a second transfer function and a third transfer function. The processor modifies a primary transmission feedback path output signal with the second transfer function and a secondary transmission feedback path output signal with the third transfer function. The processor adds the modified primary transmission feedback path output and the modified secondary transmission feedback path output to the reception path output, thereby canceling the remaining fraction of the self-interference.

Yet another aspect of the present invention relates to a single channel full duplex wireless communication system including a processor, a transmitter coupled to the processor, a receiver coupled to the processor. The transmitter transmits a transmission signal via a transmission path. A portion of the transmission signal is leaked. The receiver receives a received signal. The received signal includes leakage from the transmission signal. The receiver includes at least one combining element and at least one reception path. The at least one combining element is coupled to an input of the receiver. At least one reception path is coupled to an output of the receiver. The receiver produces an output signal, the output signal including self-interference caused by the leakage from the transmission signal. The system also includes a secondary transmission path coupled to the transmitter and to the combining element. The processor is configured to estimate a first transfer function and to feed the secondary transmission path with at least a portion of the transmission signal adjusted by the first transfer function to produce a first intermediate signal at an output of the secondary transmission path. A first cancellation signal is obtained based upon the first intermediate signal. The first cancellation signal is subsequently combined with the received signal in the at least one combining element so as to reduce the self-interference in the output signal from the receiver. A second cancellation signal is generated by modifying a second intermediate signal using a second transfer function. The second transfer function is estimated by the processor. The second intermediate signal is obtained based on at least one of the transmission signal and the first intermediate signal. The second cancellation signal is subsequently combined with the output signal from the receiver within the processor, thereby further reducing the self-interference in the output signal from the receiver.

A further aspect of the present invention relates to a method of reducing self-interference caused by one or more transmission signals in a single channel full duplex wireless communication apparatus. The method includes transmitting one or more transmission signals using a transmitter, the transmitting occurring via one or more transmission paths coupled to the transmitter. One or more portions of the one or more transmission signals are leaked. The method includes receiving one or more received signals using a receiver, the one or more received signals including leakage from the one or more transmission signals. The receiver includes one or more combining elements and one or more reception paths. At least one combining element is coupled to an input of the receiver. The receiver produces one or more output signals. The one or more output signals include(s) self-interference, the self-interference being caused by the leakage from the one or more transmission signals. The method also includes generating one or more first cancellation signals. The generating of one or more first cancellation signals further includes estimating, by a processor, a first transfer function, feeding, by the processor, one or more secondary transmission paths with one or more portions of the one or more transmission signals adjusted by the first transfer function to produce one or more first intermediate signals at output(s) of the one or more secondary transmission paths, each one of the one or more secondary transmission paths being coupled to the transmitter and to the one or more combining elements of the receiver. The generating of one or more first cancellation signals further includes obtaining the one or more first cancellation signals from the one or more first intermediate signals and combining, using the one or more combining elements within the receiver, the one or more received signals with the one or more first cancellation signals in the one or more combining elements of the receiver, thereby reducing the self-interference in the one or more output signals. The method also includes generating one or more second cancellation signals. The generating of one or more second cancellation signals further includes estimating a second transfer function, the second transfer function being estimated by a processor and generating one or more second intermediate signals, the second intermediate signals being generated by obtaining portions of the one or more transmission signals. The generating of one or more second cancellation signals also includes using one or more secondary transmission feedback path output signals, wherein inputs to the one or more secondary transmission feedback paths are coupled to the outputs of the one or more secondary transmission paths and modifying the one or more second intermediate signals with the second transfer function to obtain the one or more second cancellation signals. The method also includes combining, in the processor, the one or more second cancellation signals with the one or more output signals from the receiver, thereby further reducing the self-interference in the one or more output signals.

One embodiment provides a method for improving signal-to-interference ratio in a single channel full duplex wireless communication apparatus over short, medium, and long-distances.

BRIEF DESCRIPTION OF THE DRAWINGS

The invention will be better understood from the following description of preferred embodiments together with reference to the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
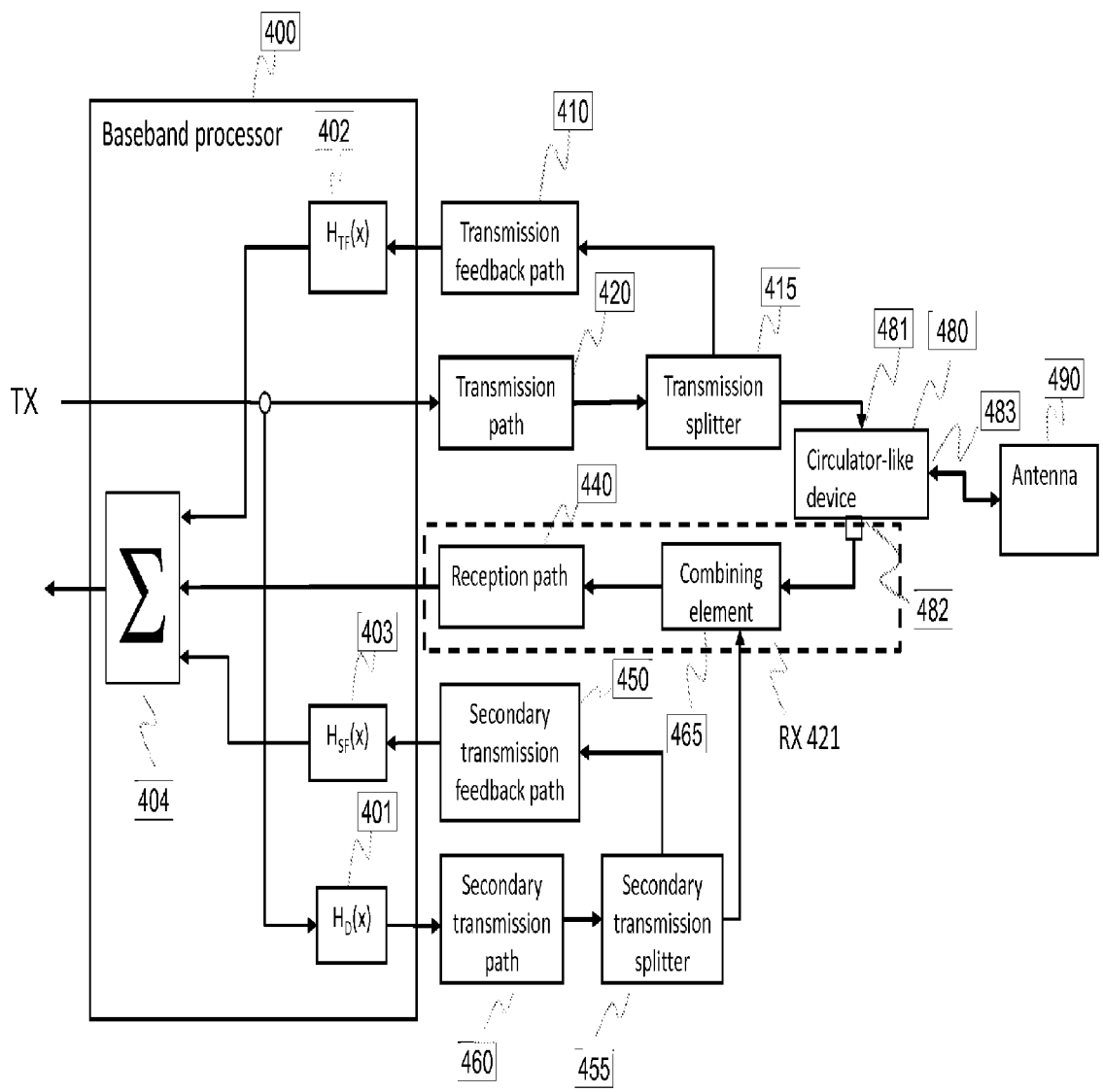
FIG. 1 is an embodiment of a single channel full duplex wireless communication system.

Turning now to the drawings, FIGS. 1-6 show different embodiments of a single channel full duplex wireless communication system that is configured to operate at a wide range of frequencies and to provide sufficient cancellation such that the system may be employed for short, medium, and long-distance wireless communications. FIG. 1 shows an embodiment of a single channel full duplex wireless communication system including a baseband processor 400, a transmission path 420, a transmission splitter 415, a transmission feedback path 410, a reception path 440, a combining element 465, a secondary transmission path 460, a secondary transmission splitter 455, a secondary transmission feedback path 450, and a circulator-like device 480 that connects the transmission path 420 via the transmission splitter 415; and the reception path 440 via the combining element 465; to the antenna 490. A receiver 421 includes the combining element 465 and the reception path 440. The input to the receiver 421 is port 482 which in FIG. 1 is also an output port of a circulator-like device 480.

The transmission path 420 and the reception path 440 communicate in both the transmission and the reception direction, while using the same channel at the same time, unlike half-duplex and full-duplex systems described above. The circulator-like device 480 that connects the transmission path 420 and the reception path 440 to the antenna 490 is a circulator or an equivalent device or circuit that is configured to allow the signal entering the circulator-like device 480 through port 481 to exit through port 483 with minimal attenuation (less than approximately 1 dB) and with only a minor part of signal energy exiting through port 482 (approximately 1% of total transmission signal energy or 20 dB). Moreover, the circulator-like device 480 is further configured to allow the signal entering the circulator-like device 480 through port 483 to exit through port 482 with minimal attenuation.

The transmission splitter 415 is a directional coupler or similar device that takes a fraction of transmitted signal power at the output of the transmission path 420 and feeds it to the transmission feedback path 410, while feeding most of the transmitted signal power to the port 481. The secondary transmission splitter 455 is a directional coupler, splitter or similar device that feeds a fraction of the signal power at the output of the secondary transmission path 460 to the secondary transmission feedback path 450 and another fraction of the power of the same signal to the combining element 465. The combining element 465 may be a combiner or a similar device that is capable of combining the signal from port 482 with the signal from the secondary transmission splitter 455 and feeding the resulting combined signal to the reception path 440.

The main challenge in a full-duplex communication system and especially in a single channel full duplex system is the self-interference, i.e., the interference caused by the transmission signal on the received signal. Signal strength diminishes quickly over distance; thus the strength of the received signal is much weaker than that of the transmission signal. Simultaneously decoding the weak signal while transmitting the strong transmission signal has been a challenge. Particularly, sufficient attenuation of the noise associated with the self-interference has been a major obstacle to implementation of single channel full duplex systems.

The circulator-like device 480 that connects the transmitter 422 and receiver 421 to the antenna via the transmission splitter 415 and the combining element 465 respectively provides some isolation between the transmitter 422 and the receiver 421, but the isolation is not sufficient to achieve decent/acceptable receiver performance. Since the same channel is used for the transmission and reception direction, there is no frequency separation between the operation of the transmitter and the receiver. This prevents the use of frequency selective filtering, such as FDD systems that are used in existing full-duplex wireless communication systems to enhance the isolation between the transmission path 420 and reception path 440. Some transmission signal strength gets reflected at the interface between the circulator-like device 480 and the antenna 490, or over the air. There is no known device such as the circulator-like device 480 that would be capable of properly attenuating these reflections of the transmission signal.

A practical circulator-like device 480 is generally capable of offering isolation in the range of 20 dB for an implementation using passive components or 50 dB for an implementation using passive and active components (e.g., active interference canceling techniques). Active techniques generally differ from passive techniques at least in that active techniques utilize a powered source. Assuming the transmission signal is 20 dBm, the power of the leaked transmission signal at the input of the receiver 421 (port 482) would be around 0 dBm or −30 dBm, respectively. If the received signal is −90 dBm, the signal-to-interference ratio caused by self-interference would be −90 dB or −60 dB, respectively. Thus, signal-to-interference ratio would be not only negative, but it would also be such that the leaked transmitted signal (the one causing self-interference) would cause distortion in the reception path 440 to a level that nothing could be done in the baseband processor to recover the received signal with an acceptable signal-to-interference ratio.

For the receiver 421 to operate properly it is necessary to provide a method for reducing the power of the transmitted signal leaked to the input of the receiver 421 (port 482) to a level that does not cause distortions in the reception path 440, and to provide a method to further improve the signal-to-interference ratio in the baseband processor 400.

To reduce the power of the transmitted signal leaked to the input of the receiver (port 482), the baseband processor 400 feeds a secondary transmission path 460 with a signal adjusted in such a way that it cancels the transmission signal leaked to the port 482. To do this, the baseband processor 400:

(1) estimates the transfer function $H_{Tx}(x)$ from the input of the transmission path 420 to the input of the reception path 440;

(2) estimates the transfer function $H_{Sx}(x)$ from the input of the secondary transmission path 460 to the input of the reception path 440;

(3) then calculates the transfer function $H_D(x)$ 401 that has the property that $H_{Sx}(H_D(x))+H_{Tx}(x)=0$. The processor 400 then passes the signal at the input of the transmission path 420 through the $H_D(x)$ transfer function 401 and applies it to the input of the secondary transmission path 460 to cancel or reduce the transmission signal leaked to the port 482.

If all transfer functions are linear then $H_{Sx}(H_D(x))=H_{Sx}(x) \cdot H_D(x)$ and $H_D(x)$ can be computed as $H_D(x)=-H_{Tx}(x)/H_{Sx}(x)$. Further to this, if transfer functions are represented in the analog-domain the variable x is commonly denoted as s and if represented in digital-domain variable x is commonly denoted as z. Most practical implementations will use digital-domain representation of transfer functions. However, the invention is neither limited to digital-domain representation nor to linear transfer functions.

In one embodiment, the baseband processor 400 measures the transfer function $H_{TxRx}(x)=H_{Rx}(H_{Tx}(x))$ from the input of the transmission path 420 to the output of the reception path 440 and the transfer function $H_{SxRx}(x)=H_{Rx}(H_{Sx}(x))$ from the input of the secondary transmission path 460 to the output of the reception path 440, where $H_{Rx}(x)$ is the transfer function of the reception path 440, i.e., from the input of the reception path 440 to its output. The baseband processor 400 will calculate the transfer function $H_D(x)$ 401 for which $H_{SxRx}(H_D(x))+H_{TxRx}(x)=0$. This guarantees that $H_{Sx}(H_D(x))+H_{Tx}(x)=0$ at least for the frequencies of interest, i.e. frequencies for which $H_{Rx}(x)$ is not null.

In one embodiment, each of the $H_{TxRx}(x)$ and $H_{TxRx}(x)$ is estimated using an adaptive filter. An adaptive filter is adjusted to estimate the transfer function that, when applied to given input signal produces an output that resembles a given desired output signal with a minimum error. For $H_{TxRx}(x)$ the input of the adaptive filter is the input of the transmission path 420 and the desired output is the output of the reception path 440. For $H_{SxRx}(x)$ the input of the adaptive filter is the input of the secondary transmission path 460 and the desired output is the output of the reception path 440. Once $H_{TxRx}(x)$ and $H_{SxRx}(x)$ are estimated, $H_D(x)$ can then be computed using well known mathematical algorithms. In case of linear transfer function, $H_D(x)=-H_{TxRx}(x)/H_{SxRx}(x)$.

For linear transfer functions, the most common adaptive filters are Wiener and the Least Mean Square (LMS) filter. In both cases, the transfer functions are adapted by adjusting filter coefficients to minimize the mean square error (MSE) between the desired output and the actual output of the filter when applied to the supplied input. The main difference between Wiener and LMS filters is how the coefficients are adapted. With the Wiener filter, the filter coefficients are adapted only once. More precisely, the input and desired output statistical data is first collected and then the filter coefficients are calculated from the collected data. With LMS filter, the filter coefficients are adapted after every data sample is taken.

In practical implementations it may be required to use non-linear transfer functions, at the very least for $H_{TxRx}(x)$ and $H_D(x)$, if not also for $H_{SxRx}(x)$. This is especially true when the transmission path is operated closer to its maximum transmission power case in which it introduces non-linear distortions which in turn creates in-band intermodulation products. One solution is to extend the Wiener or LMS filter to allow implementation of non-linear transfer functions. In digital domain both the Wiener and the LMS filters are Finite Impulse Response (FIR) filters. The output of an FIR is a weighted sum of terms that are derived from the input signal by adding delays:

$$v(n)=h_0 \cdot u(n)+h_1 \cdot u(n-1)+h_2 \cdot u(n-2)+ \ldots$$

where $u(n)$ is the input, $v(n)$ is the output and $H(z)=h_0+h_1 \cdot z^{-1}+h_2 \cdot z^{-2}+ \ldots$ is the filter transfer function whose coefficients $h_0$, $h_1$, $h_2$, ... are adapted. The nonlinear extension of an FIR is a weighted sum of terms that are derived from the input signal by adding delays and applying a Taylor series expansion. In the most general form, the nonlinear filter is:

$$v(n)=h_{10} \cdot u(n)+h_{11} \cdot u(n-1)+h_{12} \cdot u(n-2)+ \ldots +h_{200} \cdot u(n)^2+h_{211} \cdot u(n-1)^2+h_{222} \cdot u(n-2)^2+ \ldots +2 \cdot h_{201} \cdot u(n) \cdot u(n-1)+2 \cdot h_{202} \cdot u(n) \cdot u(n-2)+2 \cdot h_{212} \cdot u(n-1) \cdot u(n-2)+ \ldots +h_{3000} \cdot u(n)^3+h_{3111} \cdot u(n-1)^3+h_{3222} \cdot u(n-2)^3+ \ldots +3 \cdot h_{3001} \cdot u(n)^2 \cdot u(n-1)+ \ldots$$

and the coefficients can be adapted using the same algorithms as those used for the Wiener or LMS filters in the linear case. In most practical scenarios there is no need to include all higher order terms. For communications systems where the bandwidth is significantly smaller than the center frequency, the even order intermodulation products are located outside of the bandwidth of existing circuits and are filtered out, which means there is no need to include even powers in the filter terms. Furthermore, power decreases with the order of the intermodulation products. For example, the $5^{th}$ order intermodulation products have much lower power that the $3^{rd}$ order intermodulation products and may not need cancellation. Then, in order to perform the necessary processing, only $1^{st}$ and $3^{rd}$ power terms are considered, that is:

$$v(n)=h_{10} \cdot u(n)+h_{11} \cdot u(n-1)+h_{12} \cdot u(n-2)+ \ldots +h_{3000} \cdot u(n)^3+h_{3111} \cdot u(n-1)^3+h_{3222} \cdot u(n-2)^3+ \ldots +3 \cdot h_{3001} \cdot u(n)^2 \cdot u(n-1)+ \ldots$$

Due to limited precision, noise, and various imperfections, the secondary transmission path 460 is generally not adapted to provide a desired amount of cancellation. The transmission path 460 can typically improve signal-to-interference ratio by an amount in the range of 60 dB, which is generally not sufficient to provide a satisfactory signal-to-interference ratio. Thus, in one embodiment, the baseband processor 400 is further adapted to provide additional cancellation.

In the preferred embodiment, the baseband processor 400 uses the transmission feedback path 410 and the secondary transmission feedback path 450 to acquire the signals at the output of the transmission path 420 and the secondary transmission path 460 (including the noise, the linear and the non-linear distortions). The baseband processor 400 then estimates the transfer functions $H_{TF}(x)$ 402 and $H_{SF}(x)$ 403 that need to be applied to the signal at the outputs of the transmission feedback path 410 and the secondary transmission feedback path 450, respectively, so that, when added to the received signal present at the output of the reception path 440, the remaining self-interference is completely cancelled or significantly reduced. In one embodiment the $H_{TF}(x)$ and $H_{SF}(x)$ are adaptive filters with the desired output being the output of the reception path multiplied by −1. In other words, they will adapt to subtract any transmit signal, noise and distortion left after the cancelation done at the input to the reception path. In another embodiment one of the adaptive filters $H_{TF}(x)$ and $H_{SF}(x)$ is trained with the desired output being the output of the reception path multiplied by −1 while the other is trained with the desired output being the result of adding the output of the other filter to the output of the reception path, everything multiplied by −1. In other words, in the embodiment the two cancelers are cascaded instead of working in parallel.

Figure 2:
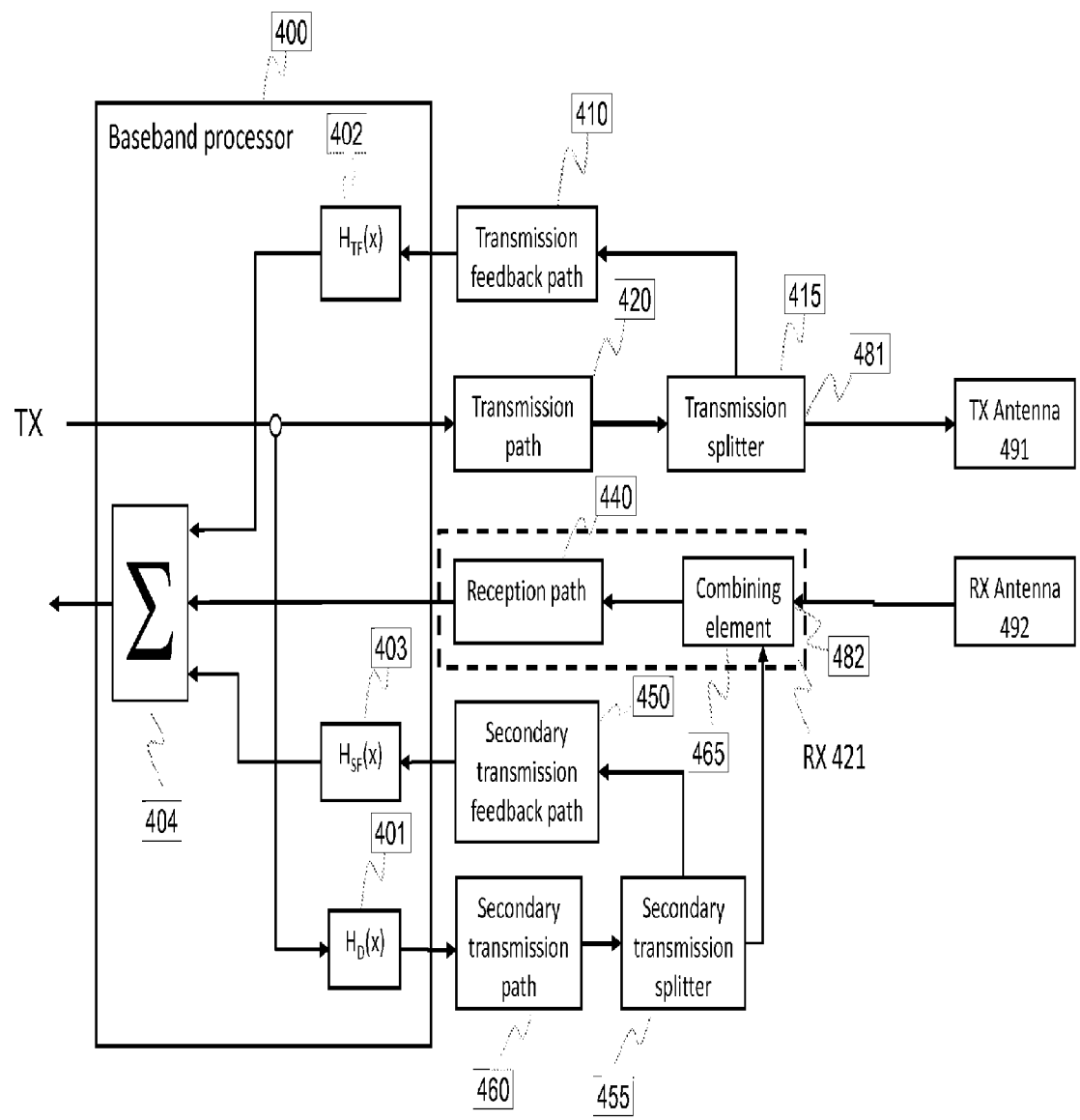
FIG. 2 is another embodiment of a single channel full duplex wireless communication.

FIG. 2 shows an embodiment of a single channel full duplex wireless communication system, where a transmission antenna 491 is connected, via the transmission splitter 415, to the transmission path 420, and a receiver antenna 492 is connected, via the combining element 465, to the reception path 440. The receiver 421 still comprises combining element 465 and reception path 440, and the input to the receiver is port 482. The crosstalk between the two antennas, transmitter antenna 491 and receiver antenna 492, plus the over-the-air reflections cause transmission signal to leak into the input of the receiver (port 482). In other words, the signal received by the combining element 465 from the receiver antenna 492 experiences self-interference due to the leaked transmission signal. Such self-interference needs to be cancelled or reduced in order to achieve desired wireless system performance.

The transmission signal leak is addressed by the processor 400 estimating and applying a transfer function $H_D(x)$ 401 that has the property that $H_{Sx}(H_D(x)) + H_{Tx}(x) = 0$. The processor 400 then passes the signal at the input of the transmission path 420 through the transfer function $H_D(x)$ 401 and applies it to the input of the secondary transmission path 460 to cancel or significantly reduce the transmission signal leaked into the input of the receiver (the port 482) at the input of the reception path 440.

Moreover, this embodiment also provides additional cancellation in the baseband processor 400 via transmission feedback path 410 and the secondary transmission feedback path 450 as described above in relation to FIG. 1.

Figure 3:
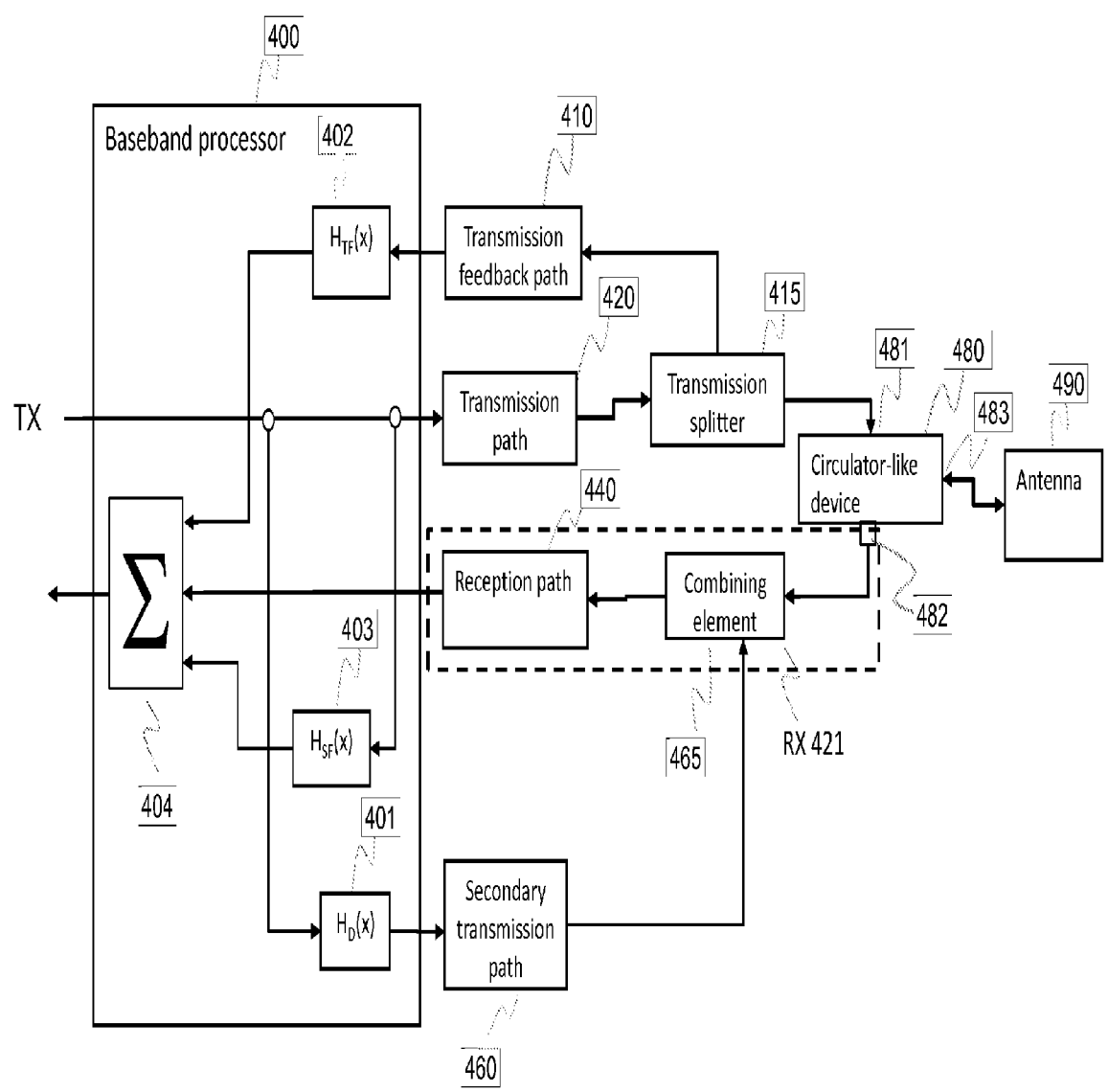
FIG. 3 is another embodiment of a single channel full duplex wireless communication system.
Figure 5:
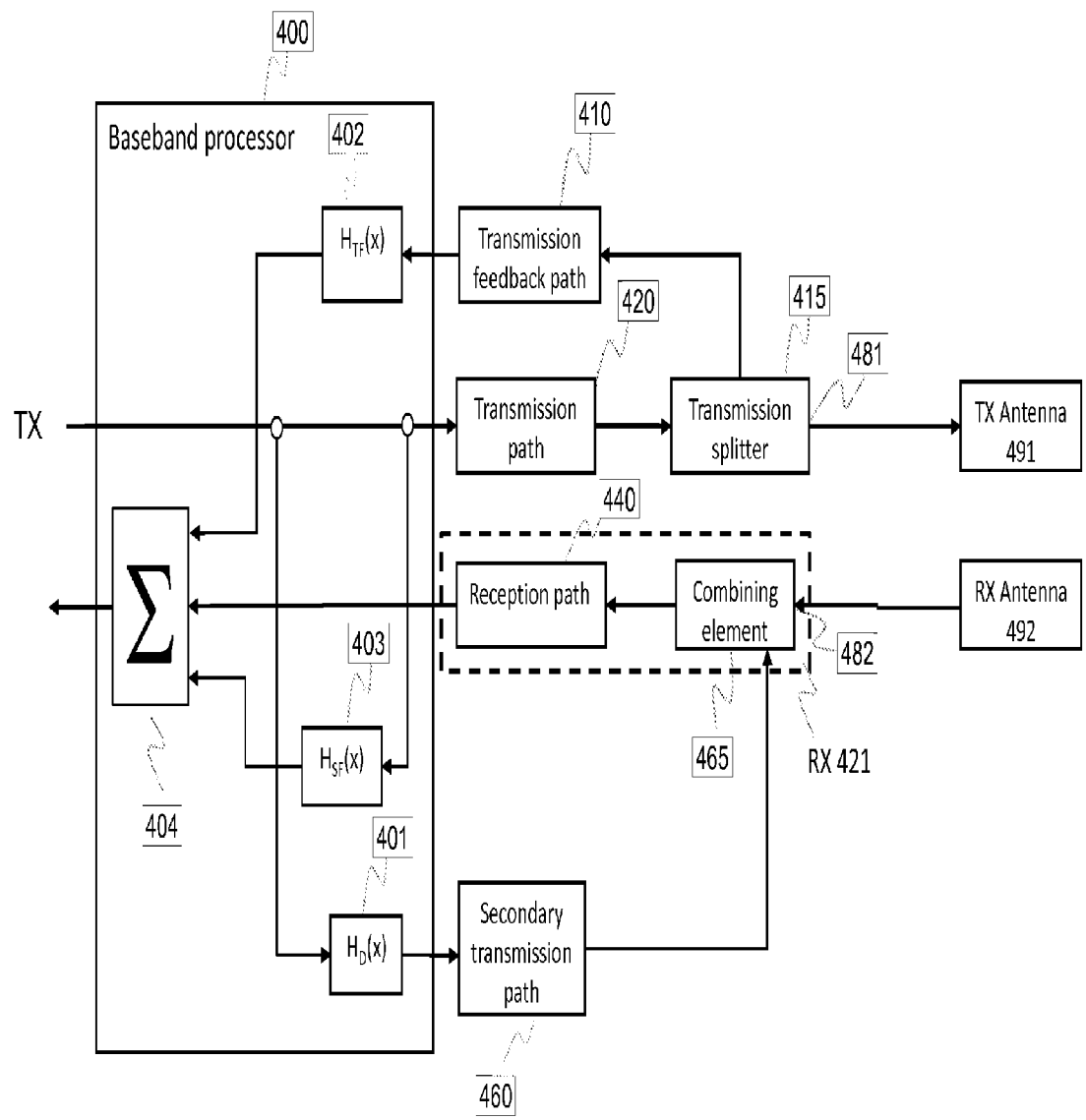
FIG. 5 is another embodiment of a single channel full duplex wireless communication system.

FIG. 3 shows an embodiment of a single channel full duplex wireless communication system where the secondary transmission feedback path 420 of FIG. 1 is not used and the secondary transmission path 460 is connected to the combining element 465. This solution is adapted for systems where the noise of the secondary transmission path 460 is low enough that cancellation in baseband processor 400 is not required. FIG. 5 is a variation of the embodiment shown in FIG. 3 in which the transmission path 420 is connected, via the transmissions splitter 415, to the transmission antenna 491 and the reception path 440 is connected, via the combining element 465, to the receiver antenna 492. In both FIG. 3 and FIG. 5, the input to the receiver 421 is port 482, which is also an output port of a circulator-like device 480.

Figure 4:
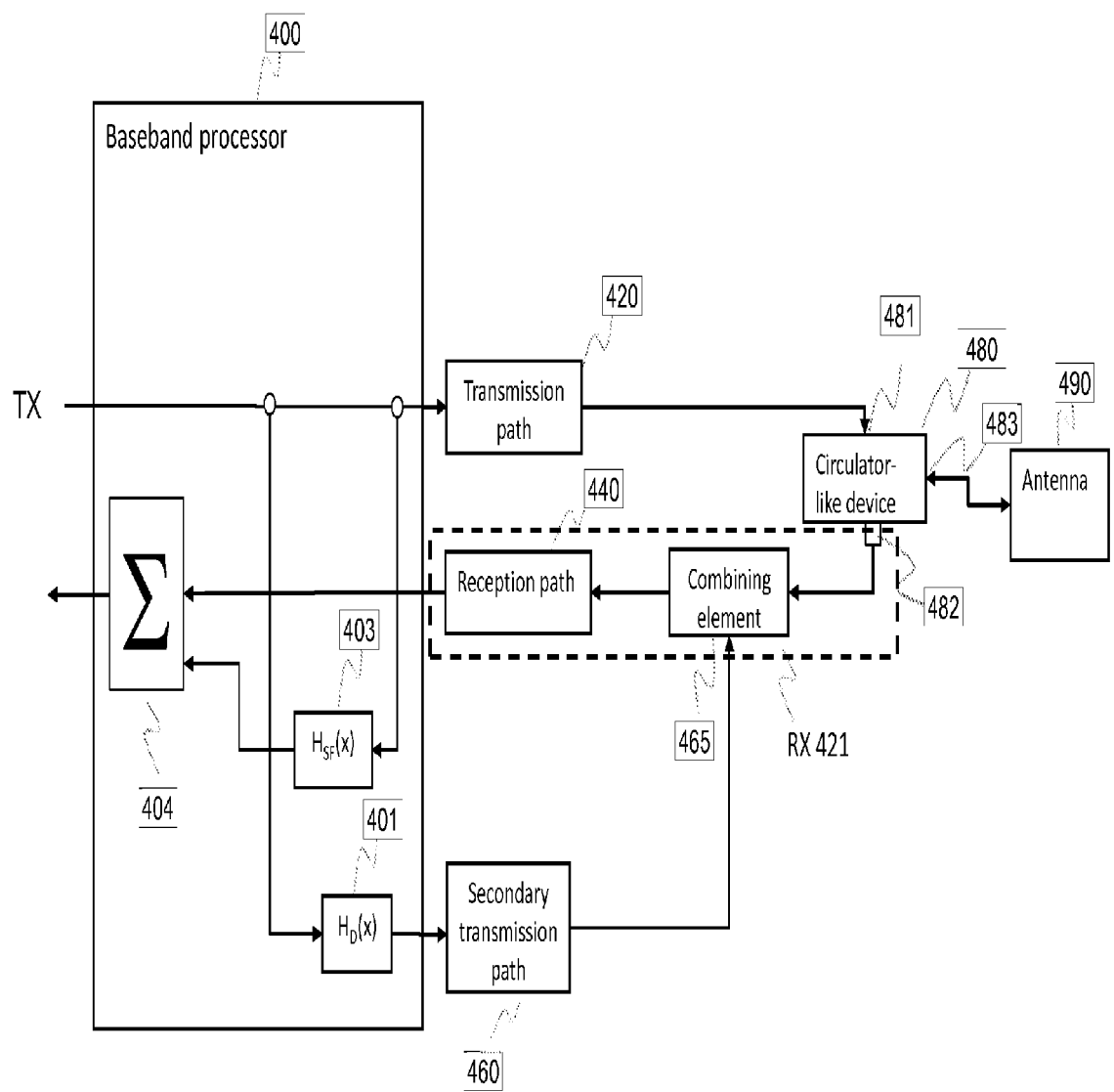
FIG. 4 is another embodiment of a single channel full duplex wireless communication system.
Figure 6:
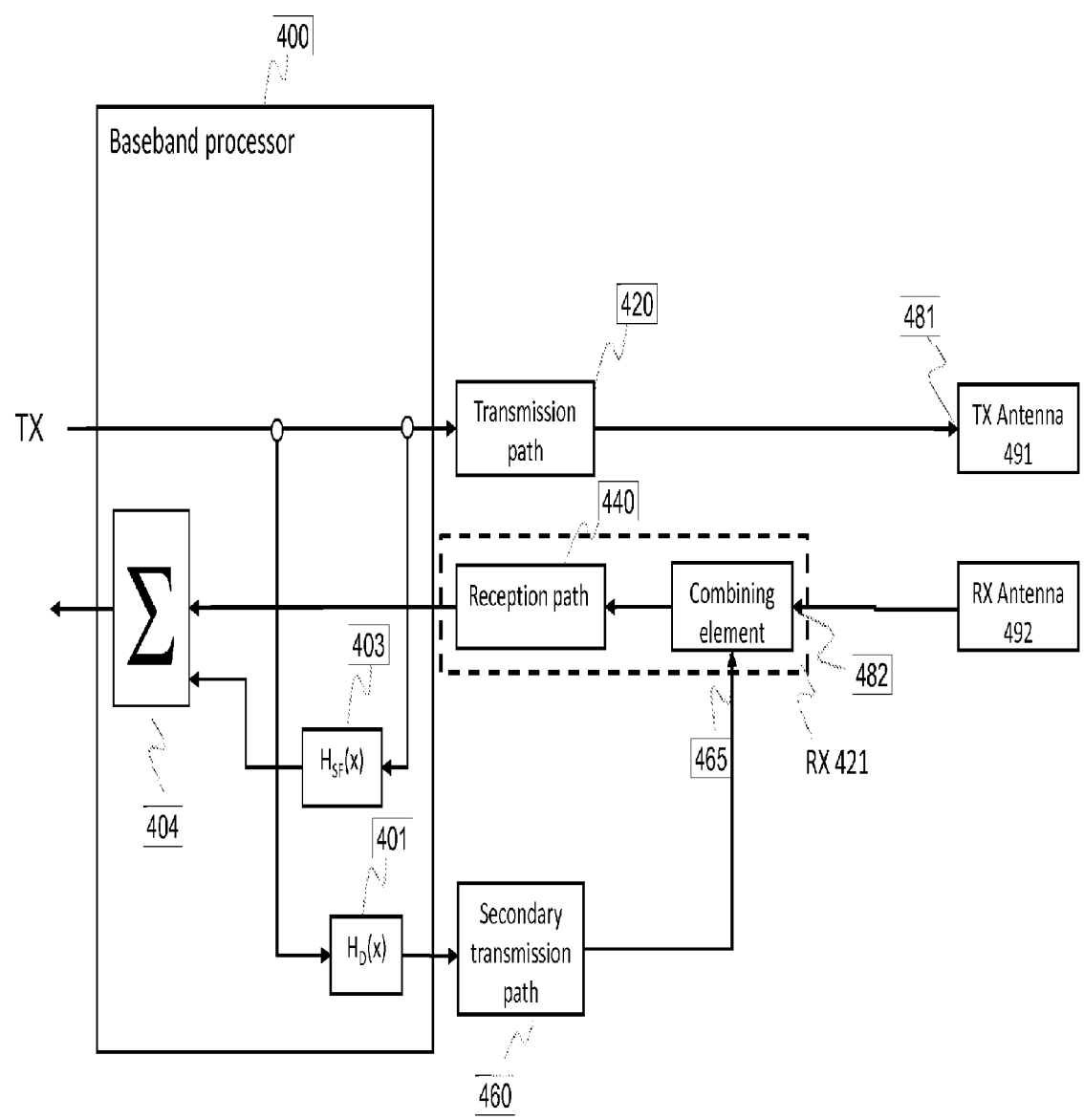
FIG. 6 is another embodiment of a single channel full duplex wireless communication system.

FIG. 4 shows an embodiment of a single channel full duplex wireless communication system where the secondary transmission path 460 is connected directly to the combining element 465 and where the transmission path 420 is connected directly to the circulator-like device 480. Both the transmission feedback path 410 and secondary transmission feedback path 450 of FIG. 1 are not used. This solution is adapted for systems where the noise of both the transmission path 420 and the secondary transmission path 460 is low enough that cancellation in baseband processor 400 is not required. FIG. 6 is a variation of the embodiment shown in FIG. 4 in which the transmission path 420 is directly connected to the transmission antenna 491 and the reception path 440 is connected, via the combining element 465, to the receiver antenna 492.

Other embodiments of single channel full frequency communication systems can be provided, containing multiple secondary transmission paths 460, some of them containing their own splitters 455 and secondary feedback paths 450, feeding via different combining elements 465 into different stages of the reception path 440, wherein the transmission path 420 is connected to the port 481 of the circulator-like device 480 and the reception path 440 is connected, via one of the combining elements 465 to port 482, which as previously explained is both an input port to the receiver, and an output port of the circulator-like device 480. Every stage achieves removal of additional undesired signal leaked from the transmission path 420. This method can offer much better removal of undesired signal leaked from the transmission path 420.

Another embodiment of single channel full frequency communication systems can be provided, containing multiple secondary transmission paths 460, some of them containing their own splitters 455 and feedback paths 450, feeding via different combining elements 465 into different stages of the reception path 440, wherein the transmission path 420 is connected to the transmission antenna 491 and the reception path 440 is connected, via one of the combining elements 465, to the receiver antenna 492. Every stage achieves removal of additional undesired signal leaked from the transmission path 420. This method can offer significantly better removal of undesired signal leaked from the transmission path 420.

Another embodiment of single channel full frequency communication systems containing multiple-input and multiple-output (MIMO) may be provided wherein there are multiple transmission paths 420 and multiple reception paths 440. There will be, for example M reception paths 440 and N transmission paths 420. There will be M secondary transmission paths 460, one for each reception path 440. Such an arrangement can significantly improve communication performance. Specifically, in wireless communications, it offers significant increases in data transmission and link range without using any additional spectrum or transmit power. It achieves this by higher spectral efficiency and link reliability. There will be N transmission feedback paths 410 and M secondary transmission feedback paths 450. The baseband processor 400 feeds each secondary transmission path 460 with the necessary signal to cancel or reduce the interference from each transmission path 420 to the respective reception path 440. The baseband processor 400 supplies the signals at the input of the M secondary transmission paths 460 through an M×N matrix of transfer functions $H_D(s)$ 401. In other words, each of the M inputs will be the sum of N transmitted signals processed through N distinct transfer functions.

Similarly, there will a matrix of M×N $H_{TF}(x)$ 402 transfer functions and a matrix of M×M $H_{SF}(x)$ 403 transfer functions that need to be applied to the signal at the outputs of the transmission feedback path 410 and the secondary transmission feedback path 450, respectively, so that, when added to the received signal present at the output of the reception path 440, the remaining self-interference is completely cancelled.

The embodiments described above are implemented in a variety of ways. Generally, the embodiments described above may be implemented using hardware, software or a combination of hardware and software elements. The hardware aspects may include combinations of operatively coupled hardware components including microprocessors, logical circuitry, communication/networking ports, digital filters, memory, or logical circuitry. The hardware may be adapted to perform operations specified by a computer-executable code, which may be stored on a computer readable medium.

The baseband processor 400 described above may be implemented in a variety of ways, using, for example, an external conventional computer or an on-board field programmable gate array (FPGA) or digital signal processor (DSP), that executes software, or stored instructions. The baseband processor 400 may be implemented using one or more networked or non-networked general purpose computer systems, microprocessors, field programmable gate arrays (FPGAs), digital signal processors (DSPs), microcontrollers, and the like, programmed according to the teachings of the exemplary embodiments of the present invention, as is appreciated by those skilled in the computer and software arts.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGAs), digital signal processors (DSPs), microcontrollers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A wireless communications system, the system comprising:
   a processor;
   a plurality of N transmission paths and a plurality of M reception paths, the N transmission paths and the M reception paths coupled between the processor and a MIMO antenna;
   a plurality of N secondary transmission paths coupled between the processor and the input to each of the M reception paths;
   wherein the processor estimates the amount of first distortions introduced into the input of each of the M reception paths from the outputs of each of the N transmission paths;
   wherein the processor also estimates the amount of second distortions introduced into the output of each of each of the M reception paths from the outputs of each of the N transmission paths and the outputs of each of the N secondary transmission paths; and;
   wherein the processor processes a plurality of received signals received from the M reception paths to reduce the first distortion and the second distortion, wherein the processor estimates a transfer function from the attenuated outputs of the N secondary transmission paths to the inputs of the M reception paths, the attenuated outputs of the N secondary transmission paths being combined with the inputs of the M reception paths to cancel the outputs of the N transmission paths coupled into the inputs of the M reception paths.

* * * * *